US007269736B2

(12) United States Patent
Howard et al.

(10) Patent No.: US 7,269,736 B2
(45) Date of Patent: Sep. 11, 2007

(54) DISTRIBUTED CRYPTOGRAPHIC METHODS AND ARRANGEMENTS

(75) Inventors: Michael Howard, Bellevue, WA (US); Jason Garms, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 763 days.

(21) Appl. No.: 09/797,210

(22) Filed: Feb. 28, 2001

(65) Prior Publication Data

US 2002/0118836 A1    Aug. 29, 2002

(51) Int. Cl.
 *H04L 9/00* (2006.01)
 *H04K 1/00* (2006.01)
 *G06F 11/30* (2006.01)
 *G06F 12/14* (2006.01)
 *G06Q 40/00* (2006.01)
 *H04L 9/32* (2006.01)

(52) U.S. Cl. .................. 713/179; 713/176; 713/180; 713/189; 713/193; 713/194; 380/44; 380/47; 380/277; 705/56

(58) Field of Classification Search ................ 713/168, 713/189, 200, 182, 190, 201, 165, 166, 193, 713/176, 179, 180, 194; 380/29, 277, 4, 380/52, 25, 262–280, 44, 47; 705/56
See application file for complete search history.

(56) References Cited

U.S. PATENT DOCUMENTS

| | | | | |
|---|---|---|---|---|
| 5,481,611 A * | 1/1996 | Owens et al. | ................ | 713/159 |
| 5,640,456 A * | 6/1997 | Adams et al. | ............... | 713/153 |
| 5,689,565 A * | 11/1997 | Spies et al. | .................. | 713/189 |
| 5,878,142 A * | 3/1999 | Caputo et al. | .............. | 713/159 |
| 5,940,506 A * | 8/1999 | Chang et al. | ............... | 713/189 |
| 6,021,203 A * | 2/2000 | Douceur et al. | ............ | 380/252 |
| 6,049,612 A * | 4/2000 | Fielder et al. | ................. | 380/44 |
| 6,067,076 A * | 5/2000 | Hocker et al. | .............. | 345/158 |
| 6,246,768 B1 * | 6/2001 | Kim | ............................ | 380/28 |
| 6,337,911 B1 * | 1/2002 | Dillon | ........................ | 380/262 |
| 6,351,813 B1 * | 2/2002 | Mooney et al. | ............. | 713/185 |
| 6,389,535 B1 * | 5/2002 | Thomlinson et al. | ....... | 713/165 |
| 6,618,807 B1 * | 9/2003 | Wang et al. | ................. | 713/189 |
| 6,643,775 B1 * | 11/2003 | Granger et al. | ............. | 713/190 |
| 6,715,078 B1 * | 3/2004 | Chasko et al. | .............. | 713/193 |
| 6,735,693 B1 * | 5/2004 | Hamlin | ....................... | 713/168 |
| 6,775,769 B1 * | 8/2004 | Inada et al. | .................. | 713/153 |
| 2002/0016914 A1 * | 2/2002 | Seki et al. | ................... | 713/172 |
| 2002/0094085 A1 * | 7/2002 | Roberts | ...................... | 380/262 |
| 2002/0101993 A1 * | 8/2002 | Eskin | ......................... | 380/270 |

* cited by examiner

*Primary Examiner*—Christopher Revak
*Assistant Examiner*—Shin-Hon Chen
(74) *Attorney, Agent, or Firm*—Lee & Hayes, PLLC

(57) ABSTRACT

First and second computing devices are selectively operatively coupled together. The first device provides data to the second device. The second device can be a portable computing device. The second device is configured to encrypt/decrypt the data, as needed by the first device. The second device maintains the cryptographic key data internally. As such, the first device, which, for example, may be a personal computer will only maintain the returned encrypted data following encryption and only temporarily use any returned decrypted data. Thus, by physically and operatively distributing the cryptographic processing/maintenance between the two devices, additional security is provided for protecting private data.

41 Claims, 4 Drawing Sheets

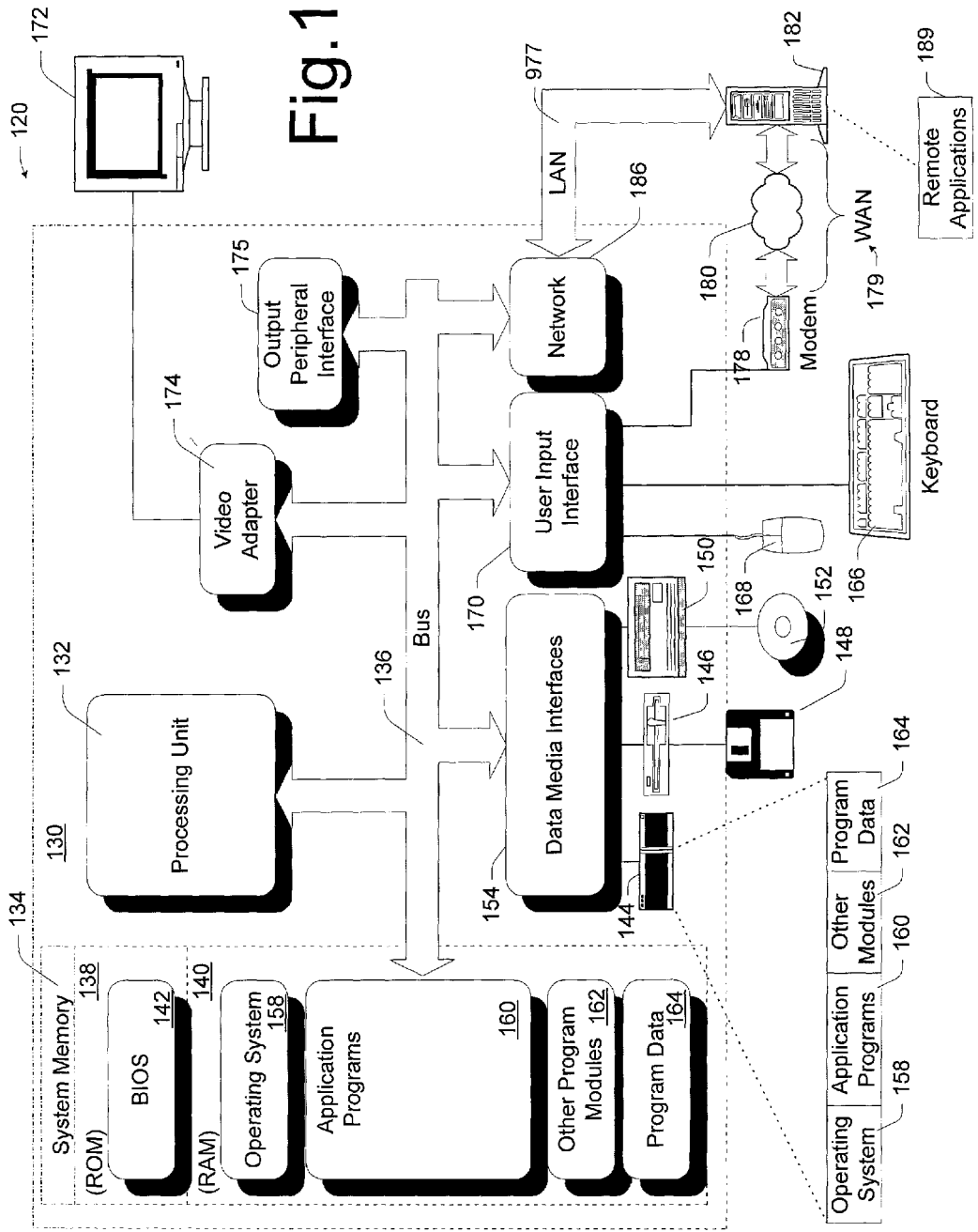

DISTRIBUTED CRYPTOGRAPHIC METHODS AND ARRANGEMENTS

TECHNICAL FIELD

The present invention relates generally to computers and like devices, and more particularly to methods and arrangements for providing a more secure cryptographic environment.

BACKGROUND

There is a continuing need to keep certain information secure within a computer. For example, many computer operating systems and applications require users to initially and/or periodically generate passwords, which are subsequently used to verify the user's identity. These passwords represent one form of "private data" that preferably needs to be stored within the computer in some significantly secure manner.

Typically, passwords and other forms of private data are encrypted prior to storage, for example, using an encryption algorithm and an associated encryption key. During subsequent retrieval, the encrypted private data is decrypted using a decryption algorithm and the encryption key.

One of the drawbacks to this encrypting/decrypting process is that both the encrypted data and the encryption key need to be stored somewhere within the computer. This presents a point of weakness within the overall security of the private data, since an unauthorized user needs only to determine/locate the encryption key to gain access to the encrypted private data. Hence, passwords and other supposedly secret information files may fall prey to hackers that have gained access to the computer.

Consequently, there is a need for improved methods and arrangements for securing private data.

SUMMARY

Improved methods and arrangements are provided for securing private data.

By way of example, in accordance with certain aspects of the present invention, first and second computing devices are selectively, operatively coupled together. The first device provides data to the second device. The second device may, for example, be a portable computing device. The second device is configured to encrypt/decrypt the data, as needed by the first device. The second device maintains the cryptographic key data internally. As such, the first device, which, for example, may be a personal computer or like device will only maintain the returned encrypted data following encryption and only temporarily use any returned decrypted data. Thus, by physically and operatively distributing the cryptographic processing/maintenance between the two devices, additional security is provided for protecting private data.

BRIEF DESCRIPTION OF THE DRAWINGS

A more complete understanding of the various methods and arrangements of the present invention may be had by reference to the following detailed description when taken in conjunction with the accompanying drawings wherein:

FIG. 1 is a block diagram that depicts an exemplary device, in the form of a computer, which is suitable for use with certain implementations of the present invention.

DETAILED DESCRIPTION

Figure 2A:
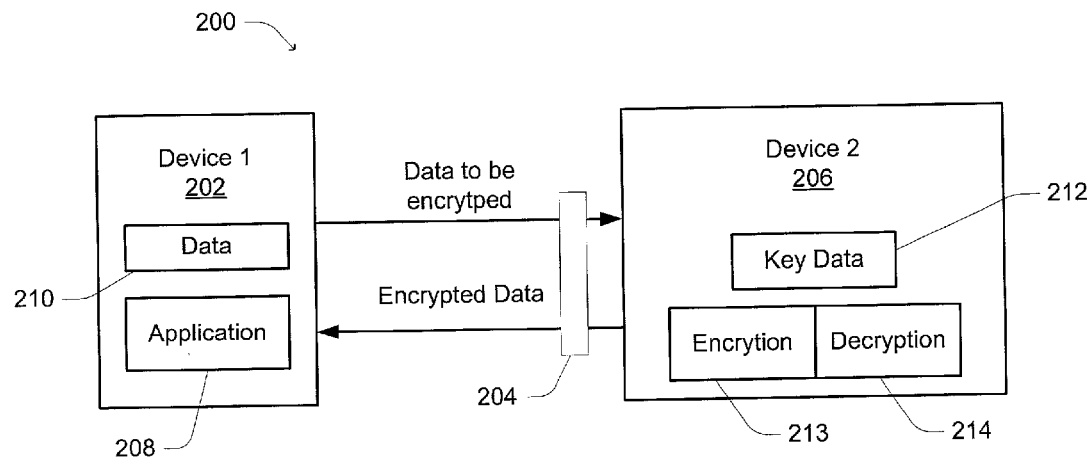
FIGS. 2a-b are block diagrams depicting two devices that are selectively coupled together and configured to encrypt data and decrypt data, respectively, in accordance with certain exemplary implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2B:
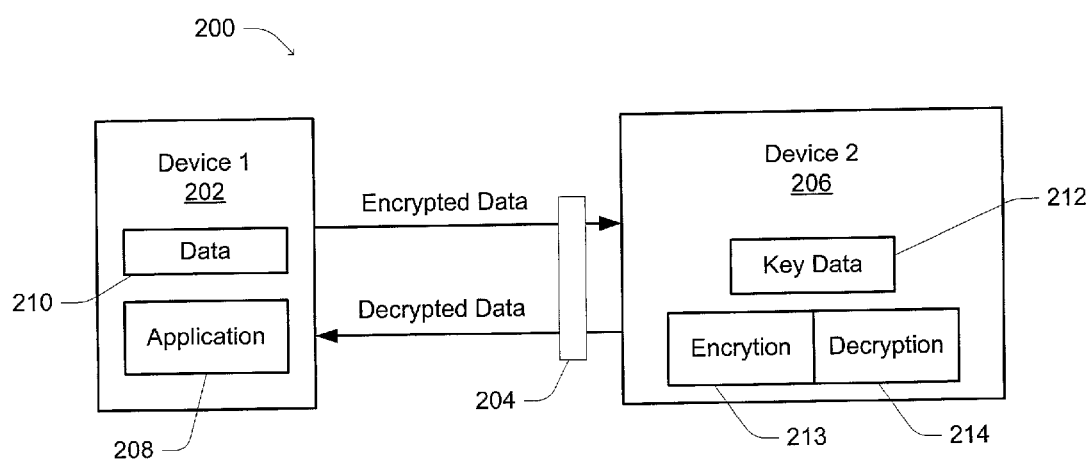

Reference is now made to FIGS. 2a-b, which are block diagrams depicting encrypting and decrypting operations that are conducted between to selectively coupled devices.

As shown in FIG. 2a, a first device 202 is selectively coupled through a coupling mechanism 204 to a second device 206. First device 202, in accordance with certain exemplary implementations is a computer, e.g., as in FIG. 1. First device 202 includes code, such as, application 208, which requires that at least a portion of data 210 be encrypted in some manner. Rather than maintaining the necessary encryption key information within first device 202 where it may be vulnerable to attacks by unauthorized users, this important information is maintained within second device 206.

While second device 206 may also be a computer, e.g., as in FIG. 1, in accordance with certain further exemplary implementations of the present invention second device 206 may also take the form of a handheld/portable computing device, such as, for example, a personal digital assistant (PDA), mobile communication device, smart card, etc. Thus, for example, second device 206 may be a Pocket PC device, a Palm Pilot device, a mobile telephone device, a pager device, a wristwatch device, and the like.

Nevertheless, for simplicity, in the following exemplary implementations it will be assumed that first device 202 is a conventional PC and that second device 206 is a conventional Pocket PC device. In which case, coupling mechanism 204 is usually a cradle mechanism configured to hold second device 206 and provide the requisite electrical connections between first device 202 and second device 206. Here, for example, coupling mechanism 204 can be connected to first device 202 using a USB interface.

One feature to this type of configuration is that the user can easily (i.e., selectively) couple or decouple the two devices simply by physically placing second device 206 in coupling mechanism 204 or physically removing second device 206 from coupling mechanism 204. This is advantageous, since device 206, as shown in this example, includes encryption key data 212 and associated encryption logic 213 and decryption logic 214. By having the capability for the user to selectively decouple first device 202 and second device 206, unauthorized users will find it nearly impossible to gain access to both the encrypted data that is stored in first device 202 and the corresponding encryption key data 212, encryption logic 213 and decryption logic 214, which are maintained in second device 206.

As for the operation of this distributed encryption scheme, as depicted in FIG. 2a, data to be encrypted is provided by first device 202 to second device 206. Second device 206 encrypts the data (i.e., private data) using key data 212 and encryption logic 213. The resulting encrypted data is then provided back to first device 202 for storage.

As depicted in the similar block diagram of FIG. 2b, when application 208 requires that the stored encrypted data be decrypted, then the encrypted data is provided to second device 206. Second device 206 decrypts the encrypted data (i.e., private data) using key data 212 and decryption logic 214. The resulting decrypted data is then provided back to first device 202 for use.

With this general description in mind, a more detailed description will now be provided for certain exemplary operations associated with key data 212, encryption logic 213 and decryption logic 214.

Those skilled in the art will recognize that key data 212 can be generated using any conventional encryption key generating methods. Furthermore, encryption logic 213 and decryption logic 214 may employ any of a variety of known cryptography algorithms. The exact details of these methods and algorithms are beyond the scope of this detailed description.

Figure 3:
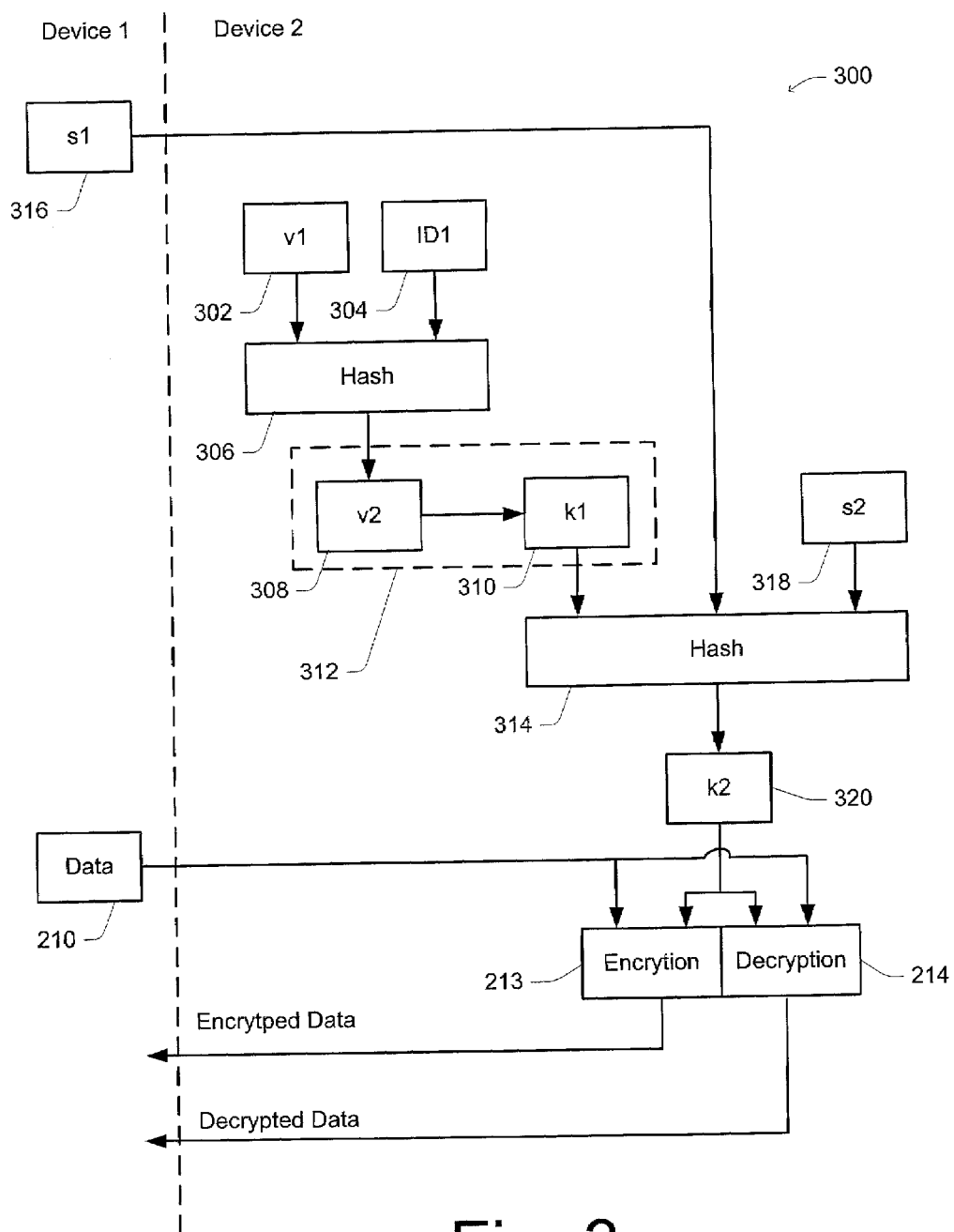
FIG. 3 is a block diagram depicting certain functional operations between two devices, for example, as in FIGS. 2a-b, in support of encryption/decryption processes, in accordance with certain exemplary implementations of the present invention.

With this in mind, FIG. 3 is a block diagram depicting methods and arrangements for encrypting and decrypting data within the two-device configuration of FIGS. 2a-b.

Although not necessary in all implementations, it would usually be preferable to maintain key data 212 in some secure form within second device 206. For example, a configuration 300 in FIG. 3 obfuscates key data 212 to provide additional security against unauthorized users, should they somehow gain access to second device 206.

Here, in this example, a random value v1 302 is provided within second device 206. Next, random value v1 302 and a device identifier ID1 304 are provided to a hash function 306 (or otherwise processed) to produce a resulting value v2. Random value v1 302, can, for example, be an n-bit random binary number, e.g., 128-bit random number. Device identifier ID1 304 can, for example, be a binary representation of a user-defined name for second device 206, e.g., "Mike's Pocket PC", or the like.

Resulting value v2 308 is then used, in this example, to identify (e.g., point to) a key seed k1 310. In this example, resulting value v2 308 and key seed k1 310 are associated together within a registry file 312 or the like. As described below with reference to FIG. 4, registry file 312 may further include one or more decoy entries.

Next, key seed k1 310 is provided, along with at least one other seed data to a hash function 314 (or otherwise processed) to produce a real key k2 320. In this example, key seed k1 310 is hashed with a first seed s1 316 provided by the first device and a second seed s2 provided by the second device. For example, first seed s1 316 may be the binary representation of the name of the application, a user-provided input, etc. Second seed s2 318 may, for example, be an internally maintained unique device identifier, e.g., a serial number or the like, or a pre-programmed value. By way of example, each Compaq iPAQ Pocket PC has a unique tag number that can be used for second seed s2 318.

Key 320 is then provided to either encryption logic 213 or decryption logic 214, as needed, to complete the encryption or decryption of data as provided to the second device by the first device. The resulting encrypted or decrypted data is then provided by the second device to the first device.

To provide additional security, the user may be required to provide an authorizing input, e.g., proceed or cancel, to the second device prior to allowing it to either encrypt or decrypt data.

Figure 4:
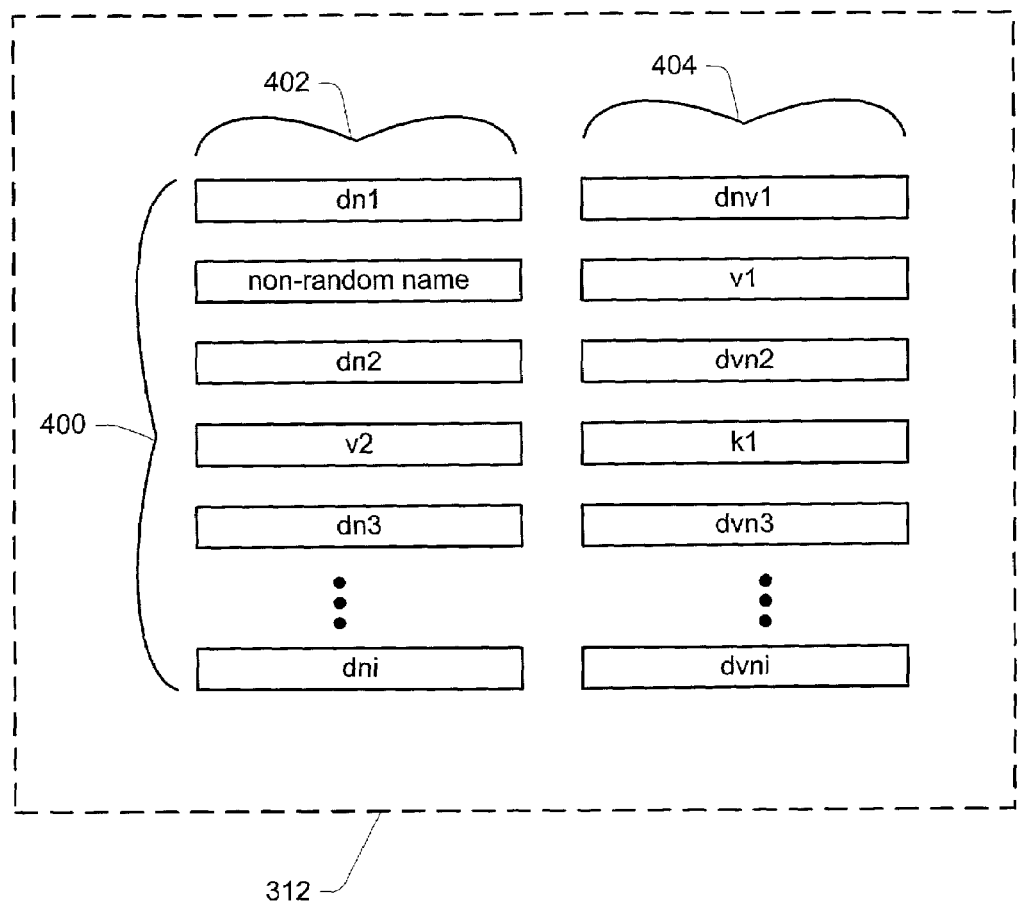
FIG. 4 is an illustrative representation of obfuscated encryption information within a device used for encryption/decryption of data, in accordance with certain exemplary implementations of the present invention.

Attention is now drawn to the illustrative representation in FIG. 4. Here, as previously mentioned, a registry file is depicted as having a plurality of pairs 400 of associated name entries 402 and value entries 404. Most of the entries in this exemplary registry file 312 are decoys. Mixed in with these decoys, however, are random number value v1, resulting value v2 and key seed k1. Random name entries are identified as dn1, dn2, dn3, . . . , dni. Random value entries are identified as dvn1, dvn2, dvn3, . . . , dvni.

Stepping through the exemplary operation of configuration 300 in FIG. 3 using registry file 312 of FIG. 4, to determine random value v1 302, a pre-specified non-random name is found in the name entries of registry file 312. As illustrated, random value v1 is associated with this pre-specified non-random name. Following hash function 306, resulting value v2 308 is then found in the name entries 402. As illustrated, associated with resulting value v2 one finds key seed k1. Key seed k1 310 can then be hashed with one or more other seed values (e.g., s1, s2) as previously described to generate key data k2 320.

This is but one exemplary method for obfuscating or otherwise hiding portions of the seed data required to generate the actual encryption key (k2).

Thus, although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
 causing a first computing device to provide data to a physically distinct, portable computing device; and
 causing the portable computing device to cryptographically modify the data and provide the resulting cryptographically modified data to the first computing device, wherein the first computing device does not cryptographically modify the data and wherein the portable computing system comprises encryption logic that is configured to encrypt the data using at least one cryptographic key and to maintain the cryptographic key in an obfuscated form, said maintaining comprising:
 generating a first hash value using a random value and a portable computing system identifier;

using the first hash to identify a first key seed in a registry file, wherein the registry file contains one or more decoy values; and generating a second hash value using the first key seed and a second key seed, wherein the second hash value corresponds to the cryptographic key.

2. The method as recited in claim 1, wherein causing the portable computing device to cryptographically modify the data includes causing the portable computing device to decrypt the data using at least one cryptographic key.

3. The method as recited in claim 1, wherein causing the portable computing device to cryptographically modify the data and provide the resulting cryptographically modified data to the first computing device further includes maintaining cryptographic key seed data on the portable computing device and preventing the cryptographic key seed data from being identified by the first computing device.

4. The method as recited in claim 3, wherein causing the portable computing device to cryptographically modify the data further includes cryptographically processing the cryptographic key seed data and at least one identifying seed data to generate at least one cryptographic key and using the cryptographic key to cryptographically modify the data.

5. The method as recited in claim 4, wherein processing the cryptographic key seed data and the at least one identifying seed data to generate the at least one cryptographic key further includes causing the portable computing device to provide at least one user-defined identifying seed data.

6. The method as recited in claim 5, wherein processing the cryptographic key seed data and the at least one identifying seed data to generate the at least one cryptographic key further includes causing the portable computing device to provide at least one portable computing device identifying seed data.

7. The method as recited in claim 4, wherein processing the cryptographic key seed data and the at least one identifying seed data to generate the at least one cryptographic key further includes causing the first computing device to provide at least one identifying seed data to the portable computing device.

8. The method as recited in claim 7, wherein causing the first computing device to provide at least one identifying seed data further includes causing the first computing device to provide an application identifying seed data to the portable computing device.

9. The method as recited in claim 4, wherein cryptographically processing the cryptographic key seed data and the at least one identifying seed data to generate the at least one cryptographic key further includes hashing the cryptographic key seed data and the at least one identifying seed data to generate the at least one cryptographic key.

10. The method as recited in claim 4, wherein cryptographically processing the cryptographic key seed data and the at least one identifying seed data to generate the at least one cryptographic key further includes determining the cryptographic key seed data by cryptographically processing at least one random number with at least one second device identifying number to produce a resulting value, locating the resulting value in a file maintained within the portable computing device, wherein the resulting value located within the file is farther associated with the cryptographic key seed data.

11. The method as recited in claim 10, wherein cryptographically processing the at least one random number with the at least one portable computing device identifying number to produce the resulting value further includes hashing the at least one random number with the at least one portable computing device identifying number to produce the resulting value.

12. The method as recited in claim 10, wherein locating the resulting value in the file maintained within the portable computing device further includes initially generating the file within the portable computing device.

13. The method as recited in claim 12, wherein initially generating the file within the portable computing device further includes providing at least one decoy entry in the file.

14. The method as recited in claim 13, wherein providing the at least one decoy entries in the file further includes randomly generating the at least one decoy entry.

15. The method as recited in claim 13, wherein providing at least one decoy entry in the file further includes providing a plurality of decoy entries in the file and randomly arranging the plurality of decoy entries, the resulting value and associated cryptographic key seed data within the file.

16. The method as recited in claim 15, wherein randomly arranging the plurality of decoy entries, the resulting value and associated cryptographic key seed data within the file farther includes randomly arranging the plurality of decoy entries, the resulting value and associated cryptographic key seed data within a registry file.

17. The method as recited in claim 1, wherein causing the first computing device to provide data to the portable computing device further includes causing the first computing device to provide private data to the portable computing device.

18. The method as recited in claim 1, further comprising selectively operatively coupling the first computing device to the portable computing device.

19. A system comprising:
a first computing system; and
a physically distinct portable computing system operatively coupled to the first computing system, and wherein the first computing system is configured to output data to the portable computing system and the portable computing system is configured to cryptographically modify the data and output the resulting cryptographically modified data to the first computing system, and wherein the portable computing system comprises encryption logic that is configured to encrypt the data using at least one cryptographic key and to maintain the cryptographic key in an obfuscated form, said maintaining comprising:
generating a first hash value using a random value and a portable computing system identifier;
using the first hash to identify a first key seed in a registry file, wherein the registry file contains one or more decoy values; and
generating a second hash value using the first key seed and a second key seed, wherein the second hash value corresponds to the cryptographic key.

20. The system as recited in claim 19, wherein the portable computing system comprises decryption logic that is configured to decrypt the data using at least one cryptographic key.

21. The system as recited in claim 19, wherein the portable computing system further comprises cryptographic key seed data.

22. The system as recited in claim 21, wherein the portable computing system further comprises logic that is configured to cryptographically process the cryptographic key seed data and at least one identifying seed data to generate at least one cryptographic key and to use the cryptographic key to cryptographically modify the data.

23. The system as recited in claim 22, wherein the logic is further configured to provide at least one user-defined identifying seed data.

24. The system as recited in claim 23, wherein the logic is further configured to provide at least one portable computing system identifying seed data.

25. The system as recited in claim 22, wherein the first computing system is further configured to output at least one identifying seed data to the logic in the portable computing system.

26. The system as recited in claim 25, wherein the first computing system is further configured to output an application identifying seed data to the portable computing system.

27. The system as recited in claim 22, wherein the logic is further configured to hash the cryptographic key seed data and the at least one identifying seed data to generate the at least one cryptographic key.

28. The system as recited in claim 22, wherein the portable computing system comprises memory operatively coupled to the logic, and wherein the logic is further configured to determine the cryptographic key seed data by cryptographically processing at least one random number with at least one portable computing system identifying number to produce a resulting value, and to locate the resulting value in at least one file maintained within the memory, and wherein the resulting value located within the file is further associated with the cryptographic key seed data.

29. The system as recited in claim 28, wherein the logic is further configured to hash the at least one random number with the at Least one portable computing system identifying number to produce the resulting value.

30. The system as recited in claim 28, wherein the logic is further configured to generate the file within the memory.

31. The system as recited in claim 30, wherein the logic is further configured to generate and place at least one decoy entry in the file.

32. The system as recited in claim 31, wherein the logic is further configured to randomly generate the at least one decoy entry.

33. The system as recited in claim 31, wherein the logic is further configured to generate a plurality of decoy entries in the file and randomly arrange the plurality of decoy entries, the resulting value and associated cryptographic key seed data within the file.

34. The system as recited in claim 33, wherein the logic is further configured to randomly arrange the plurality of decoy entries, the resulting value and associated cryptographic key seed data within a registry file in the memory.

35. The system as recited in claim 19, wherein the first computing system is further configured to provide private data to the portable computing system.

36. The system as recited in claim 19, further comprising a coupling mechanism that is configured to selectively operatively couple the first computing system and the portable computing system together.

37. The system as recited in claim 19, wherein the first computing system comprises a computer.

38. The system as recited in claim 19, wherein the portable computing system comprises a portable programmable device.

39. The system as recited in claim 38, wherein the portable computing system comprises a portable programmable device selected from a group of portable programmable devices including a personal digital assistant (PDA) device, a Pocket PC device, a Palm Pilot device, a mobile communication device, a mobile telephone device, a paging device, a wearable computing device, a portable computer, and a smart card.

40. An apparatus comprising:

memory; and logic operatively coupled to the memory and configurable to receive data from a separate, external computer system, cryptographically modify the data using at least one internally generated cryptographic key, and output the resulting cryptographically modified data to the external computer system without outputting the internally generated cryptographic key, wherein the logic is further configured to encrypt the data using at least one cryptographic key and to maintain the cryptographic key in an obfuscated form, said maintaining comprising:

generating a first hash value using a random value and a portable computing system identifier;

using the first hash to identify a first key seed in a registry file, wherein the registry file contains one or more decoy values; and generating a second hash value using the first key seed and a second key seed, wherein the second hash value corresponds to the cryptographic key.

41. The apparatus as recited in claim 40, wherein the apparatus comprises a portable programmable device selected from a group of portable programmable devices including a personal digital assistant (PDA) device, a Pocket PC device, a Palm Pilot device, a mobile communication device, a mobile telephone device, a paging device, a wearable computing device, a portable computer, and a smart card.

* * * * *